US012600133B2

(12) United States Patent
Oya et al.

(10) Patent No.: US 12,600,133 B2
(45) Date of Patent: Apr. 14, 2026

(54) LIQUID EJECTION HEAD AND METHOD OF MANUFACTURING THE SAME

(71) Applicant: CANON KABUSHIKI KAISHA, Tokyo (JP)

(72) Inventors: Shuhei Oya, Kanagawa (JP); Tomoaki Kamagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/530,919

(22) Filed: Dec. 6, 2023

(65) Prior Publication Data

US 2024/0198677 A1 Jun. 20, 2024

(30) Foreign Application Priority Data

Dec. 16, 2022 (JP) ................................ 2022-201202

(51) Int. Cl.
*B41J 2/16* (2006.01)
*B41J 2/14* (2006.01)

(52) U.S. Cl.
CPC .............. *B41J 2/1623* (2013.01); *B41J 2/14* (2013.01); *B41J 2002/14362* (2013.01); *B41J 2002/14491* (2013.01)

(58) Field of Classification Search
CPC .. B41J 2/1623; B41J 2/14; B41J 2002/14362; B41J 2002/14491; B41J 2/1603; B41J 2/14072
See application file for complete search history.

(56) References Cited

U.S. PATENT DOCUMENTS

2018/0304620 A1* 10/2018 Kawamura .............. B41J 2/155

FOREIGN PATENT DOCUMENTS

JP 2012187805 A 10/2012
JP 2021160306 A * 10/2021

OTHER PUBLICATIONS

Nakajo Naoki et al., "Liquid Discharge Head and Method for Manufacture Thereof" (JP 2021/160306 A), Nov. 11, 2021, [Description of Embodiments, First Embodiment] (Year: 2021).*

* cited by examiner

*Primary Examiner* — Lisa Solomon
(74) *Attorney, Agent, or Firm* — Canon U.S.A., Inc. IP Division

(57) ABSTRACT

A liquid ejection head includes an element substrate for ejecting liquid, a support member to which the element substrate is fixed, an electric wiring board arranged onto the support member and electrically connected to the element substrate by an electric connection portion, a sealant sealing the electric connection portion, and a cover member. The cover member is fixed onto the support member, and disposed to avoid the electric connection portion and the element substrate. In a direction parallel with a surface of the element substrate, the cover member includes a part facing an outer periphery of the element substrate, and, of the part, a distance to the outer periphery of the element substrate at a first surface of the cover member bonded with the support member is greater than a distance to the outer periphery of the element substrate at a second surface that is opposite to the first surface.

12 Claims, 7 Drawing Sheets

LIQUID EJECTION HEAD AND METHOD OF MANUFACTURING THE SAME

BACKGROUND

Field

The present disclosure relates to a liquid ejection head and a method of manufacturing the same.

Description of the Related Art

To supply a driving electric signal to an energy generation element disposed in an element substrate of a liquid ejection head, the element substrate and an electric wiring board are electrically connected by a connecting member. This electric connection portion is protected by being covered by a sealant, to prevent a failure such as electrical short circuit due to adhesion of a liquid or the like. In recent years, an inkjet head, which is one type of liquid ejection head, has been performing not only recording on conventional general paper, but also recording and liquid ejection to a non-absorbable medium such as a vinyl chloride or acrylic medium. Accordingly, not only aqueous ink, but also various kinds of ink, including solvent-based ink such as ultraviolet (UV) curable ink, and latex ink, are employed as the liquid (ink) to be used. These kinds of ink each include more solvent than the conventional aqueous ink, and thus some of them easily infiltrate a sealant. Therefore, a further increase in reliability of sealing of the electric connection portion is desired.

In the liquid ejection head, a cover member having an opening portion that can accommodate the element substrate can be disposed. In this configuration, to prevent the liquid from adhering to an ejection port and the neighborhood thereof when the liquid ejection head is not used, at least a part of the opening portion of the cover member is used as a region to be capped. In this case, if the sealant for sealing the electric connection portion in the element substrate runs on the cover member, satisfactory capping cannot be achieved, which can cause a failure of liquid ejection. In other words, it is desired to inhibit running of the sealant on the cover member, while reliably sealing the electric connection portion. Japanese Patent Application Laid-Open No. 2012-187805 and Japanese Patent Application Laid-Open No. 2021-160306 each discuss a configuration that can limit a range covered by a sealant while increasing the reliability of sealing of an electric connection portion.

SUMMARY

The present disclosure is directed to providing a liquid ejection head that can inhibit running of a sealant on a cover member while securing satisfactory sealing of an electric connection portion.

According to an aspect of the present disclosure, a liquid ejection head includes an element substrate including an energy generation element for ejecting liquid, a support member to which the element substrate is fixed, an electric wiring board arranged onto the support member and electrically connected to the element substrate by an electric connection portion, a sealant sealing the electric connection portion between the element substrate and the electric wiring board, and a cover member fixed onto the support member, and disposed to avoid the electric connection portion and the element substrate when viewed from a direction perpendicular to a surface of the element substrate, wherein, in a direction parallel with the surface of the element substrate, the cover member includes a part facing an outer periphery of the element substrate, and, of the part, a distance to the outer periphery of the element substrate at a first surface of the cover member bonded with the support member is greater than a distance to the outer periphery of the element substrate at a second surface that is opposite to the first surface.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

Configuration of Liquid Ejection Head

Figure 1:
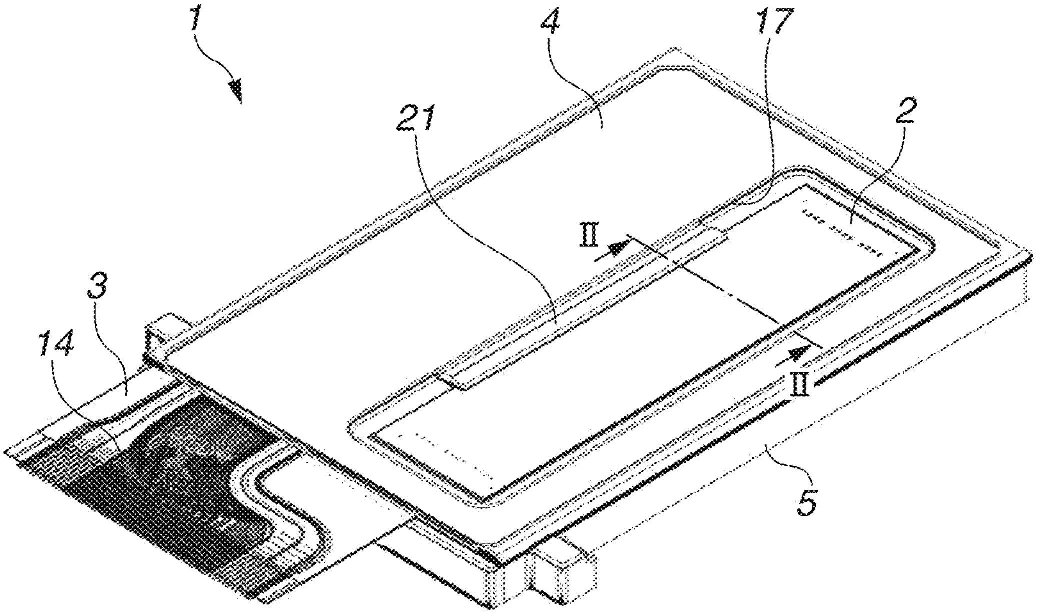
FIG. 1 is a perspective view of a liquid ejection head according to an exemplary embodiment of the present disclosure.

FIG. 1 is a perspective view of a main part of a liquid ejection head 1 according to a first exemplary embodiment of the present disclosure.

Figure 2:
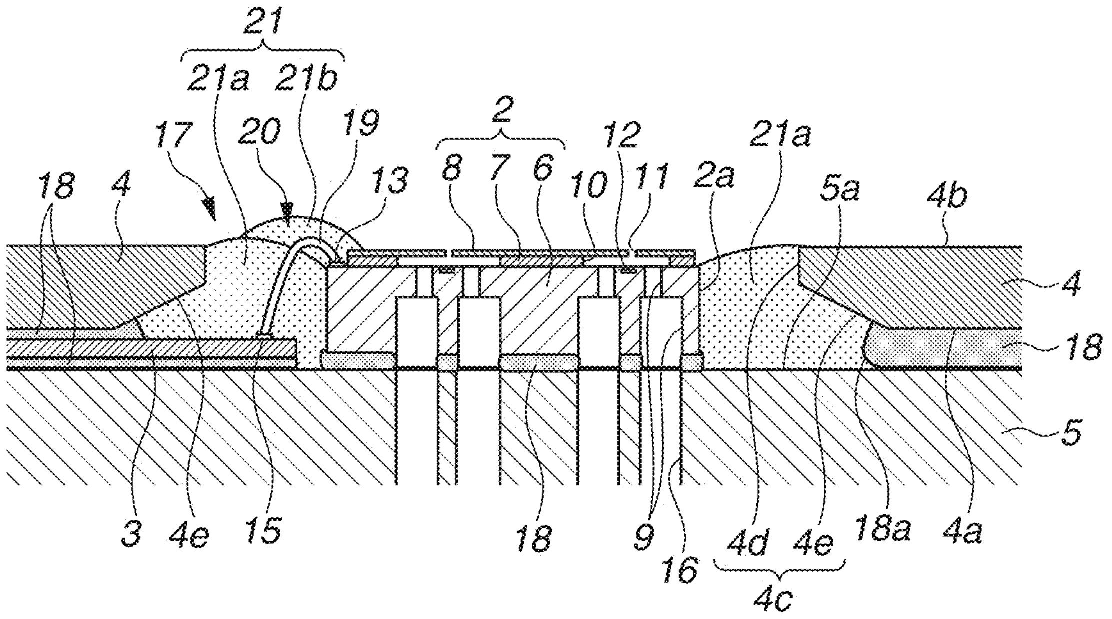
FIG. 2 is a cross-sectional view taken along a line II-II in FIG. 1.

FIG. 2 is a cross-sectional view taken along a line II-II in FIG. 1. FIGS. 3A to 3D are perspective views sequentially illustrating some of processes in a method of manufacturing the liquid ejection head 1. The liquid ejection head 1 includes an element substrate 2, an electric wiring board 3, a cover member 4, and a support member 5. The element substrate 2 of the present exemplary embodiment is a multilayer substrate in which a substrate 6, a flow path forming member 7, and an ejection port forming member 8 are laminated. The substrate 6 is, for example, a silicon substrate, and is provided with a supply path 9, which is a through hole. The flow path forming member 7 is provided with a pressure chamber 10 connected to the supply path 9. The ejection port forming member 8 is provided with an ejection port 11 communicating with the pressure chamber 10 and open to outside. On the flow path forming member 7 side of the substrate 6, each energy generation element 12 (such as a heating element or a piezoelectric element) that generates energy for ejecting a liquid from the pressure chamber 10 is formed. Further, the substrate 6 is provided with a wiring line (not illustrated) electrically connected to the energy generation element 12, and a first terminal 13 connected to a part of this wiring line. The first terminal 13 is not covered by the flow path forming member 7 and the ejection port forming member 8. The electric wiring board 3 is provided with a wiring line 14 (see FIG. 1) connected to a wiring line member (not illustrated), and a second terminal 15 connected to a part of the wiring line 14. The support member 5 has a front surface 5*a* of large area where the element substrate 2 and a part of the electric wiring board 3 can be mounted, and has a connection flow path 16 connected to the supply path 9. The cover member 4 has an opening portion 17 in which the element substrate 2 can be located. The cover member 4 is disposed to avoid an electric connection portion 20 to be described below and the element substrate 2, when viewed from a direction perpendicular to a surface of the element substrate 2.

The element substrate 2 and a part of the electric wiring board 3 are disposed side by side on the front surface 5*a* of the support member 5, and are each fixed by an adhesive 18. Further, the cover member 4 is disposed on the support member 5 so that at least a part of the electric wiring board 3 is covered when viewed from the direction perpendicular to the surface of the element substrate 2, and the second terminal 15 of the electric wiring board 3 and the element substrate 2 are located inside the opening portion 17, on the support member 5. A part of the cover member 4 is fixed to the electric wiring board 3 by the adhesive 18, and other part is fixed to the front surface 5*a* of the support member 5 by the adhesive 18. In the inside of the opening portion 17 of the cover member 4, the second terminal 15 of the electric wiring board 3 and the first terminal 13 of the element substrate 2 are connected by a connecting member (e.g., a wire 19 for bonding). The electric connection portion 20 including the first terminal 13, the wire 19, and the second terminal 15 is sealed by a sealant 21. The sealant 21 of the present exemplary embodiment includes two kinds of sealant, which are a first sealant 21*a* located at a lower layer, and a second sealant 21*b* located at an upper layer and having higher viscosity and lower flowability than the first sealant 21*a*. The first terminal 13, the second terminal 15, and a lower part of the wire 19 are sealed by the first sealant 21*a*. An upper part, which is not sealed by the first sealant 21*a*, of the wire 19 is sealed by the second sealant 21*b*. Only the electric connection portion 20 is sealed by the sealant 21 in the example illustrated in FIG. 1. However, there may be adopted a configuration in which the electric connection portion 20 is sealed by the sealants 21*a* and 21*b*, and, in a part other than the electric connection portion 20 as well, a clearance between an outer periphery 2*a* of the element substrate 2 and an inner peripheral portion 4*c* of the opening portion 17 is evenly filled with the first sealant 21*a*, as illustrated in FIG. 2 and FIGS. 3A to 3D.

In the liquid ejection head 1 of the present exemplary embodiment, a liquid is supplied from a liquid storage unit (for example, a liquid tank), which is not illustrated, to the pressure chamber 10 of the flow path forming member 7, via the connection flow path 16 of the support member 5 and the supply path 9 of the substrate 6. Further, an electric signal is supplied from the electric wiring board 3 to the energy generation element 12 via the second terminal 15, the wire 19, and the first terminal 13, at an appropriate timing. The energy generation element 12 driven by being supplied with the electric signal generates energy (e.g., heat or pressure), and a part of the liquid in the pressure chamber 10 given the energy is ejected as a droplet from the ejection port 11 to the outside. When the liquid ejection head 1 is not used, a region where the ejection port 11 is located is capped from outside by a cap 22 (see FIG. 6), to inhibit solidification of the liquid at the ejection port 11 and the neighborhood thereof. Specifically, the cap 22 abuts the front surface of the cover member 4.

Method of Manufacturing Liquid Ejection Head

Figure 3A:
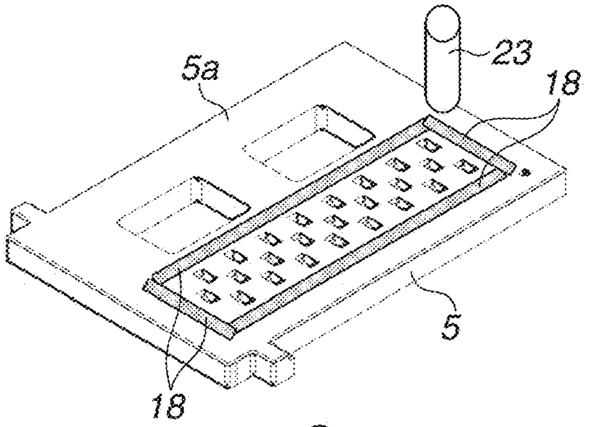
FIGS. 3A to 3D are perspective views sequentially illustrating processes in a method of manufacturing the liquid ejection head illustrated in FIG. 1.
Figure 3B:
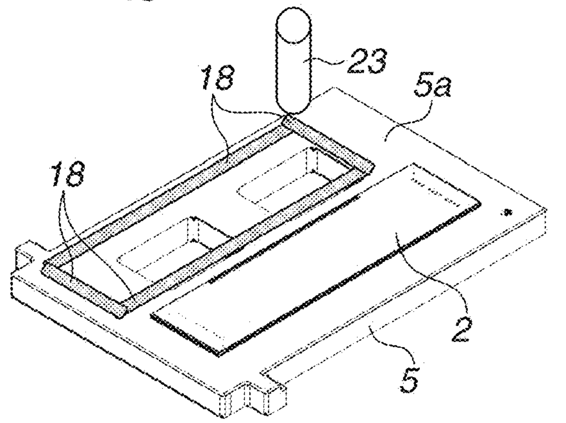

The method of manufacturing the liquid ejection head 1 of the present exemplary embodiment will be described with reference to FIGS. 3A to 3D. The adhesive 18 for fixing the element substrate 2 is applied to the front surface 5*a* of the support member 5, as illustrated in FIG. 3A. For example, the adhesive 18 is ejected from a needle 23 by an air dispensing method, and applied onto the front surface 5*a* of the support member 5. Next, the element substrate 2 is aligned with respect to the support member 5 and placed on the front surface 5*a*, as illustrated in FIG. 3B. The adhesive 18 is pressed by applying a load on the element substrate 2 to spread in a thin layer, and is cured by heat to laminate the element substrate 2 and the support member 5 together. In addition, the adhesive 18 for fixing the electric wiring board 3 is applied to the front surface 5*a* of the support member 5. Further, as with the element substrate 2, the electric wiring board 3 is laminated on the front surface 5*a* of the support member 5. The method of applying the adhesive 18 and the method of laminating the electric wiring board 3 and the support member 5 together may be the same as the methods described above. The order of fixing the element substrate 2 and fixing the electric wiring board 3 onto the front surface 5*a* of the support member 5 can be replaced with each other. The adhesive 18 of the present exemplary embodiment is an epoxy-based resin of thermosetting type. The support member 5 is not limited in terms of shape and size if the element substrate 2 and a part of the electric wiring board 3 can be laminated together, and the support member 5 can be formed of any of various materials such as ceramic, resin, and metal. In the present exemplary embodiment, the adhesive 18 of thermosetting type is used, and therefore, the support member 5 is formed of an alumina plate having high heat resistance and small thermal linear expansion.

Next, the element substrate 2 and the electric wiring board 3 fixed onto the support member 5 are electrically connected.

Figure 3C:
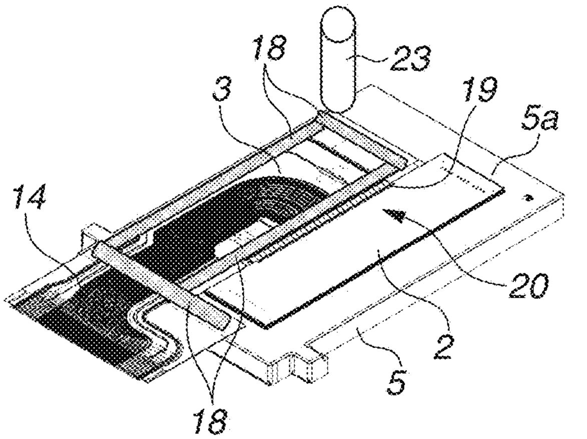

Specifically, as illustrated in FIG. 3C, the first terminal 13 of the element substrate 2 and the second terminal 15 of the electric wiring board 3 are electrically connected by performing wire bonding using the wire 19 as a connecting member. The wire 19 is maintained in a loop shape, and one end thereof is fixed to the first terminal 13, and the other end is fixed to the second terminal 15. In the present exemplary embodiment, the top portion of the loop shape formed by the wire 19 is at a position higher than the first terminal 13 of the element substrate 2 by about 0.1 mm, and the wire 19 runs downward from the top portion toward the second terminal 15 of the electric wiring board 3. Further, the adhesive 18 for fixing the cover member 4 is applied to the electric wiring board 3 and a part of the front surface 5*a* of the support member 5.

Figure 3D:
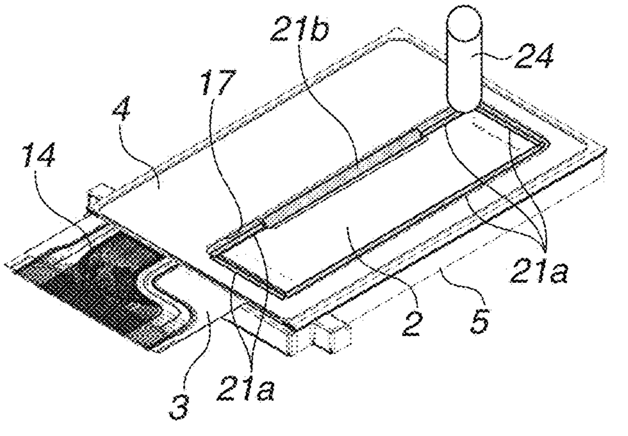

Next, as illustrated in FIG. 3D, the cover member 4 having the opening portion 17 is aligned with respect to the electric wiring board 3 and the support member 5 and laminated thereon so that the second terminal 15 of the electric wiring board 3 and the element substrate 2 are located inside the opening portion 17. Subsequently, the cover member 4 is fixed to the electric wiring board 3 and the support member 5 by the adhesive 18. Further, the first sealant 21*a* is supplied to cover most of the electric connection portion 20 including the first terminal 13, the wire 19, and the second terminal 15, and to fill the clearance between the outer periphery 2*a* of the element substrate 2 and the inner peripheral portion 4*c* of the opening portion 17 of the cover member 4. In this process, the first sealant 21*a* is ejected from a needle 24 while the needle 24 is scanned along the circumference of the planar shape of the element substrate 2 so that the first sealant 21*a* is not applied onto the element substrate 2 and the cover member 4. The clearance between the outer periphery 2*a* of the element substrate 2 and the inner peripheral portion 4*c* of the opening portion 17 of the cover member 4 is evenly filled with the first sealant 21*a*. Then, the second sealant 21*b* is applied to cover a part (mainly the top portion of the wire 19), which is not sufficiently covered by the first sealant 21*a*, of the electric connection portion 20.

In the present exemplary embodiment, the adhesive 18 is an epoxy-based resin of thermosetting type, and the cover member 4 and the support member 5 are each made of an alumina plate, which is one type of ceramic having high heat resistance and a small thermal linear expansion coefficient. Desirably, a pure water contact angle (wettability) on the surface of the cover member 4 is 40 degrees or less. The adhesive 18 is cured by applying heat to the adhesive 18 from a heating block (not illustrated) via the cover member 4. Desirably, the first sealant 21*a* is made of a material having resistance to liquid such as ink to protect the electric connection portion 20, and having satisfactory flowability as well as being curable, such as epoxy resin or acrylic resin, and has viscosity of 10 Pa·s or less in a liquid state at normal temperature. The first sealant 21*a* of the present exemplary embodiment is made of epoxy resin that is thermosetting resin having viscosity of 4 Pa·s, which has the characteristic of softening and decreasing in viscosity by application of heat, and being cured when heat at a temperature higher than or equal to a temperature at which a curing agent reacts is further applied. The second sealant 21*b* is made of a material (e.g., epoxy resin or acrylic acid resin) having resistance to liquid such as ink like the first sealant 21*a*, and having higher viscosity, not to flow out onto the ejection port forming member 8 after being applied onto the wire 19.

Cover Member

The cover member 4 of the present exemplary embodiment will be described with reference to FIGS. 4A to 4D. Of the cover member 4, a side portion facing the element substrate 2, i.e., the inner peripheral portion 4*c* (an end portion) facing the outer periphery 2*a* of the element substrate 2, in the opening portion 17 of the cover member 4, is not a mere flat surface, and refers to the entire portion substantially facing the outer periphery 2*a* of the element substrate 2. Specifically, the inner peripheral portion 4*c* facing the outer periphery 2*a* of the element substrate 2, in the opening portion 17 of the cover member 4 of the present exemplary embodiment, includes an end surface 4*d* and an inclined surface 4*e* of the inner periphery. The inclined surface 4*e* is a surface on which the distance to the outer periphery 2*a* of the element substrate 2 continuously changes. In the inner peripheral portion 4*c* having such a shape, the distance to the outer periphery 2*a* of the element substrate 2 is not constant. Specifically, of the inner peripheral portion 4*c* of the opening portion 17 of the cover member 4, a distance L1 to the outer periphery 2*a* of the element substrate 2 at a bonding surface (a first surface) 4*a* of the cover member 4 with the support member 5 is greater than a distance L2 to the outer periphery 2*a* of the element substrate 2 at an opposite surface (a second surface) 4*b* that is opposite to the bonding surface 4*a* of the cover member 4 with the support member 5. The bonding surface 4*a* is a surface that is parallel with a surface of the support member 5 facing the cover member 4 and which is in contact with the adhesive 18, and the distances L1 and L2 are distances in a direction parallel with the bonding surface 4*a*. The action and effect of this configuration will be described below.

Figure 4A:
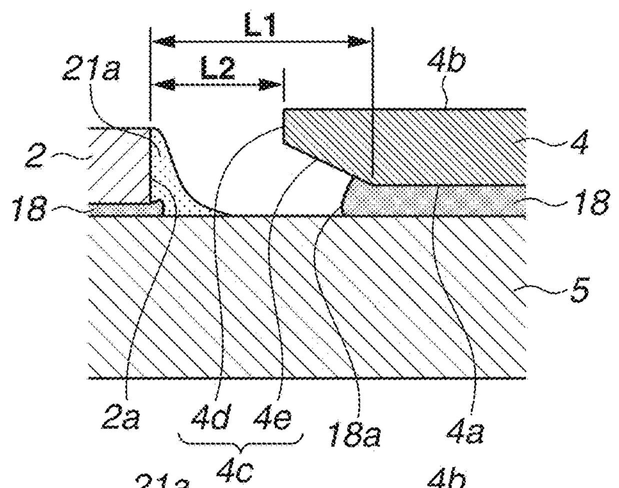
FIGS. 4A to 4D are cross-sectional views sequentially illustrating steps of a sealing process in the method of manufacturing the liquid ejection head illustrated in FIG. 1.
Figure 4B:
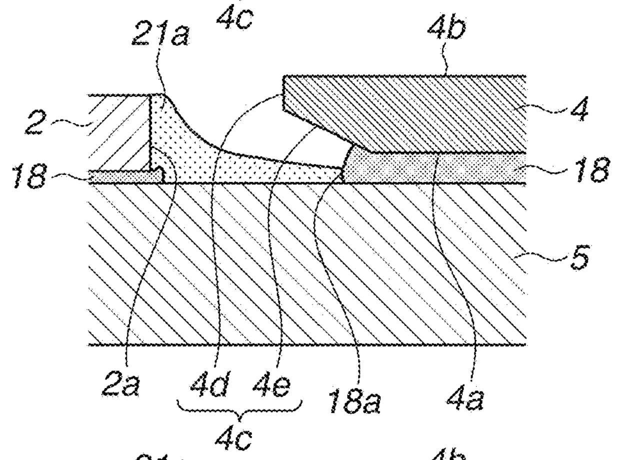
Figure 4C:
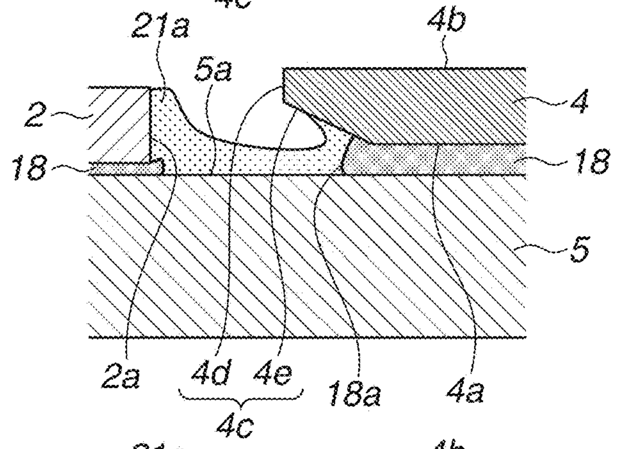
Figure 4D:
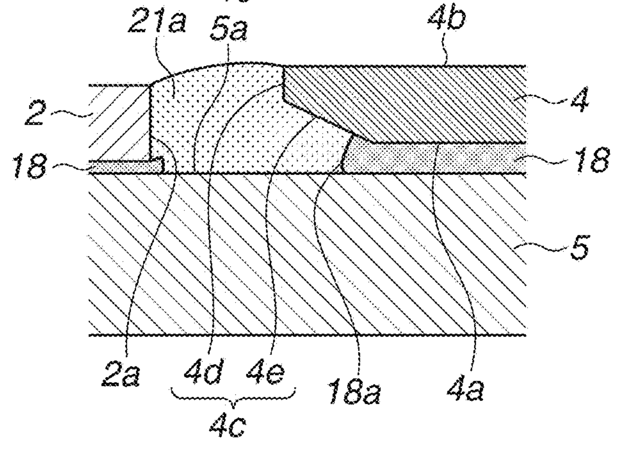

In a state where the element substrate 2, the electric wiring board 3, and the cover member 4 are fixed onto the support member 5, the first sealant 21*a* is applied to the clearance between the outer periphery 2*a* of the element substrate 2 and the inner peripheral portion 4*c* of the opening portion 17 of the cover member 4, as illustrated in FIG. 4A. The first sealant 21*a* is applied by a syringe such as a dispensing device. In the present exemplary embodiment, the element substrate 2, the support member 5, and the cover member 4 are each made of a hydrophilic material (such as silicon or alumina), and the adhesive 18 is made of a material (such as epoxy resin of thermosetting type) having higher water repellency than the element substrate 2, the support member 5, and the cover member 4. Because the element substrate 2 is hydrophilic, the first sealant 21*a* creeps up on the outer periphery 2*a* of the element substrate 2 to maintain the liquid surface by the surface tension. When filling with the first sealant 21*a* continues, as illustrated in FIG. 4B, the first sealant 21*a* flows on the support member 5 toward the cover member 4 side, because the support member 5 is hydrophilic. On the support member 5, the adhesive 18 fixing the cover member 4 to the support member 5 is present. The adhesive 18 is water-repellent, and extends toward the element substrate 2 side, farther than an end portion on the opening portion 17 side, of the bonding surface 4*a* of the cover member 4 with the support member 5. In other words, the adhesive 18 extends toward the element substrate 2 side, farther than the end portion on the side near the outer periphery 2*a* of the element substrate 2 at the bonding surface 4*a* of the cover member 4 with the support member 5. The first sealant 21*a* flowing on the support member 5 comes in contact with the adhesive 18 extending toward the element substrate 2 side, and the adhesive 18 tends to repel the first sealant 21*a* because the adhesive 18 is water-repellent. However, when the first sealant 21*a* comes in contact with the inclined surface 4*e* of the cover member 4 which is hydrophilic, after coming in contact with the adhesive 18, the first sealant 21*a* moves toward the element substrate 2 along the inclined surface 4*e* which is hydrophilic, as illustrated in FIG. 4C, so that filling is facilitated. Then, as illustrated in FIG. 4D, when the first sealant 21*a* reaches a position the same height as the height of the top surface of the cover member 4, the first sealant 21*a* is held between the outer periphery 2*a* of the element substrate 2 and the inner peripheral portion 4*c* of the opening portion 17 of the cover member 4. The liquid surface of the first sealant 21*a* located between the front surface of the element substrate 2 and the front surface of the cover member 4 is maintained by the surface tension.

In the present exemplary embodiment, of the inner peripheral portion 4*c* of the opening portion 17 of the cover member 4, the distance L1 to the outer periphery 2*a* of the element substrate 2 at the bonding surface 4*a* of the cover member 4 with the support member 5 is greater than the distance L2 to the outer periphery 2*a* of the element substrate 2 at the opposite surface 4*b* that is opposite to the bonding surface 4*a* of the cover member 4 with the support member 5. The cover member 4 extends to a position close to the outer periphery 2*a* of the element substrate 2, farther than a tip 18*a* (an end portion on the side near the element substrate 2) of the adhesive 18, at the opposite surface 4*b* (a part where the distance to the outer periphery 2*a* of the element substrate 2 is small) opposite to the bonding surface 4*a* of the cover member 4 with the support member 5. In other words, the tip 18*a* of the adhesive 18 is completely covered by the cover member 4. Therefore, the first sealant 21*a*, which has flowed to come in contact with the adhesive 18, comes in contact with the inclined surface 4*e* of the cover member 4 covering the adhesive 18. As a result, the first sealant 21*a* gradually moves toward the element substrate 2 along the inclined surface 4*e*, the liquid surface of the first sealant 21*a* is formed between the front surface of the element substrate 2 and the front surface of the cover member 4, and this liquid surface is maintained by the surface tension. In this way, according to the present exemplary embodiment, overflowing and bleeding of the first sealant 21*a* are inhibited, and the first sealant 21*a* is held in a state where the first sealant 21*a* fills the clearance between the element substrate 2 and the cover member 4, without running on the element substrate 2 and the cover member 4. Although not illustrated in FIGS. 4A to 4D, the second sealant 21*b* is further applied to the electric connection portion 20, and satisfactory sealing is performed.

Comparison with Comparative Example

Figure 5A:
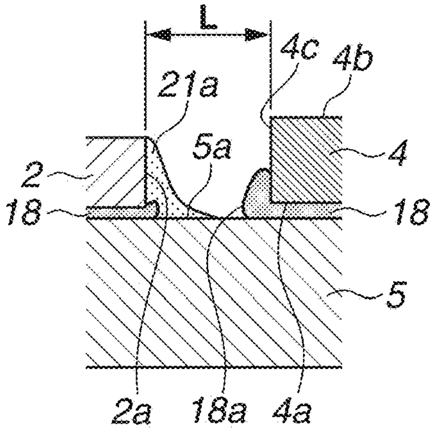
FIGS. 5A to 5D are cross-sectional views sequentially illustrating steps of a sealing process in a method of manufacturing a liquid ejection head of a comparative example.
Figure 5B:
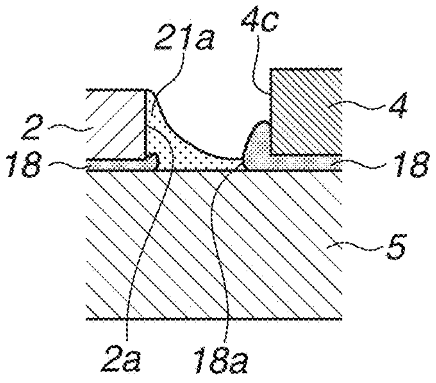
Figure 5C:
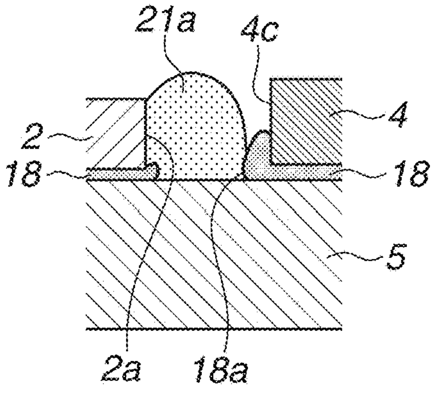
Figure 5D:
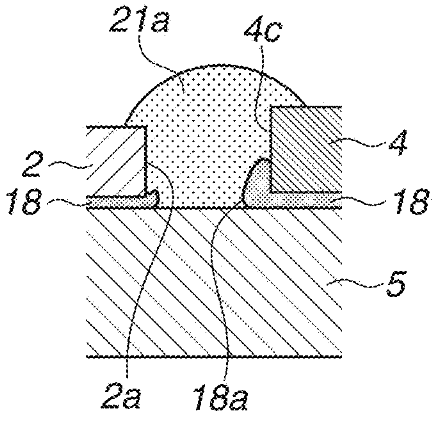

To compare with the configuration of the present disclosure, a cover member 4 of a comparative example will be described with reference to FIGS. 5A to 5C and FIG. 6. A side portion facing an element substrate 2 in the cover member 4 of the comparative example (i.e., an inner peripheral portion 4*c* facing an outer periphery 2*a* of the element substrate 2, of an opening portion 17 of the cover member 4) is a simple flat surface that extends along a thickness direction and does not include an inclined surface or a step. Therefore, at this inner peripheral portion 4*c*, the distance to the outer periphery 2*a* of the element substrate 2 is constant. In this comparative example, as illustrated in FIG. 5A, when a first sealant 21*a* is applied to a clearance between the outer periphery 2*a* of the element substrate 2 and the inner peripheral portion 4*c* of the opening portion 17 of the cover member 4, the first sealant 21*a* creeps up on the outer periphery 2*a* of the element substrate 2 which is hydrophilic. When filling with the first sealant 21*a* continues, as illustrated in FIG. 5B, the first sealant 21*a* flows on a support member 5, which is hydrophilic, toward the cover member 4 side, and comes in contact with an adhesive 18. The adhesive 18 is water-repellent, and therefore repels the first sealant 21*a*. In this comparative example, the inner peripheral portion 4*c* of the opening portion 17 of the cover member 4 is a simple flat surface that does not include an inclined surface or a step and extends along the thickness direction. The inner peripheral portion 4*c* of the cover member 4 does not extend to a position close to the outer periphery 2*a* of the element substrate 2, farther than a tip 18*a* of the adhesive 18, and the tip 18*a* of the adhesive 18 is not covered by the cover member 4. Therefore, as illustrated in FIG. 5C, the first sealant 21*a* repelled by coming in contact with the adhesive 18 is in a state where the first sealant 21*a* is swelled between the outer periphery 2*a* of the element substrate 2 and the adhesive 18, without coming in contact with the inner peripheral portion 4*c* of the opening portion 17 of the cover member 4. In this state, a clearance is formed between the first sealant 21*a* and the inner peripheral portion 4*c* of the cover member 4. To eliminate this clearance, it is desirable to supply the first sealant 21*a* excessively. If the first sealant 21*a* is excessively supplied, as illustrated in FIG. 5D, the first sealant 21*a* being excessive overflows from between the outer periphery 2*a* of the element substrate 2 and the inner peripheral portion 4*c* of the cover member 4, when the first sealant 21*a* completely fills the clearance and comes in contact with the inner peripheral portion 4*c* of the cover member 4. As a result, the first sealant 21*a* runs on the front surface of each of the element substrate 2 and the cover member 4.

Figure 6:
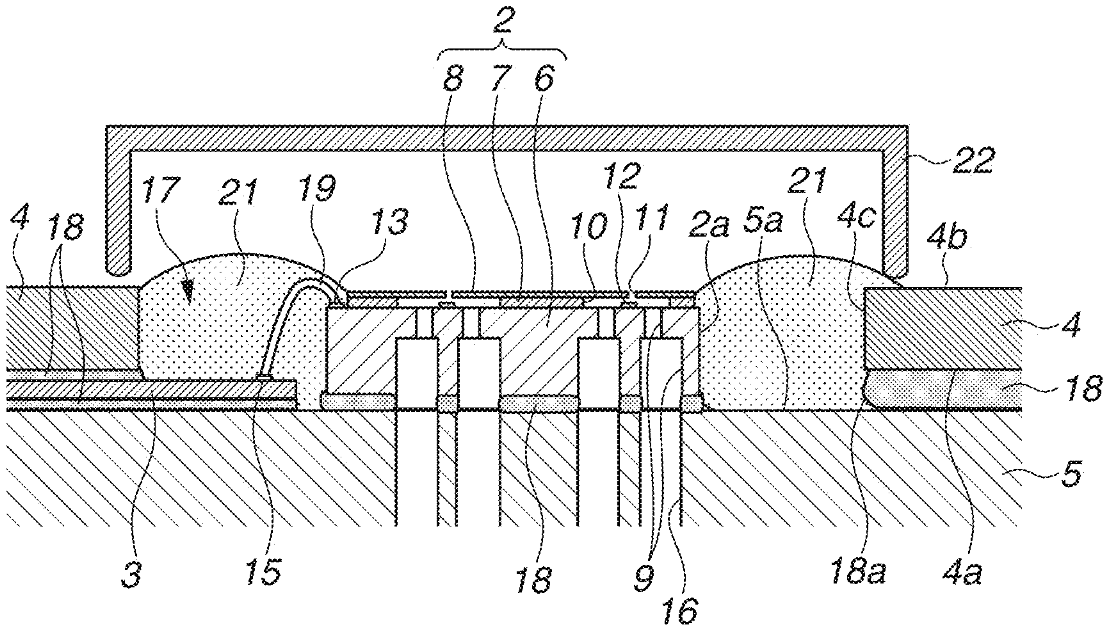
FIG. 6 is a cross-sectional view schematically illustrating a capped state of the liquid ejection head of the comparative example.

It is difficult to precisely control the amount of the first sealant 21*a* running on the front surface of each of the element substrate 2 and the cover member 4, and the flow of the first sealant 21*a* on the front surface of each of the element substrate 2 and the cover member 4. For this reason, as illustrated in FIG. 6, the range of the spread of the first sealant 21*a* on the front surface of the cover member 4 and the height of the first sealant 21*a* are not constant. Therefore, it is difficult to seal a liquid ejection head 1 with a cap 22 when capping the liquid ejection head 1, and a clearance can be formed between the cap 22 and the cover member 4. If the cap 22 is excessively pressed against the cover member 4, a partially contactless clearance can be formed between the cap 22 and the cover member 4 due to occurrence of distortion and deformation in the cap 22, or the cap 22 may be easily released in part due to an insufficient contact pressure caused by variation of the contact pressure.

As a result, the reliability of the cap 22 decreases, so that a process for inhibiting solidification of a liquid at an ejection port 11 and the neighborhood thereof cannot be well performed, which can cause a failure of liquid ejection.

As described above, in the comparative example in which the inner peripheral portion 4*c* of the opening portion 17 of the cover member 4 is a simple flat surface that does not include an inclined surface or a step and extends along the thickness direction, the first sealant 21*a* can run on the cover member 4, which can decrease the reliability of the cap 22. In contrast, in the first exemplary embodiment of the present disclosure, the first sealant 21*a* that has come in contact with the adhesive 18 abuts the inclined surface 4*e* covering the adhesive 18, and moves along the inclined surface 4*e*, so that the first sealant 21*a* fills the clearance between the element substrate 2 and the cover member 4 starting from the bottom portion. As a result, a space between the element substrate 2 and the cover member 4 is filled with the first sealant 21*a*, so that no clearance is formed. Therefore, it is not necessary to apply the first sealant 21*a* excessively, and the first sealant 21*a* does not overflow from between the element substrate 2 and the cover member 4, so that running of the first sealant 21*a* on the front surface of the cover member 4 can be inhibited. When capping the liquid ejection head 1, the cap 22 can seal by coming in contact with the front surface of the cover member 4 without being disturbed by the first sealant 21*a*. This makes it possible to perform satisfactory capping, and to inhibit solidification of the liquid at the ejection port 11 and the neighborhood thereof. In addition, in the present exemplary embodiment, the clearance between the element substrate 2 and the cover member 4 can be filled with the first sealant 21*a*, and the electric connection portion 20 can be well sealed. Although not illustrated, the inner peripheral portion 4*c* of the cover member 4 may be provided with, in place of the inclined surface 4*e*, a curved surface that is a curved surface where the distance to the outer periphery 2*a* of the element substrate 2 changes substantially in a continuous manner.

Figure 7A:
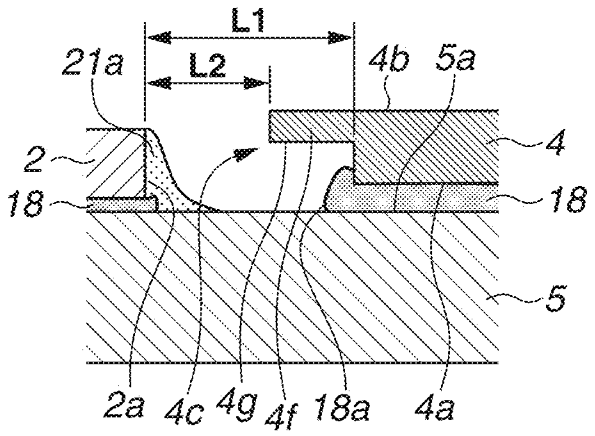
FIGS. 7A to 7D are cross-sectional views schematically illustrating steps of a sealing process in a method of manufacturing a liquid ejection head according to a second exemplary embodiment of the present disclosure.
Figure 7B:
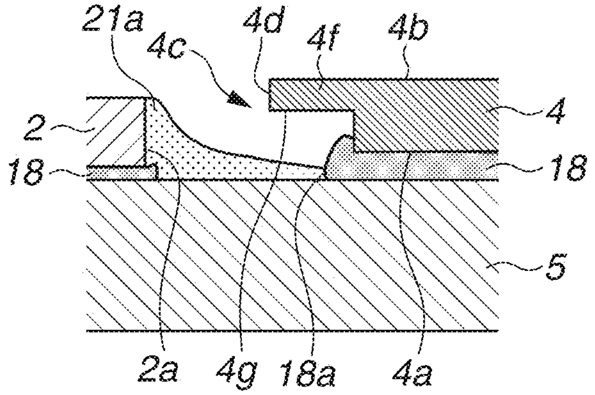
Figure 7C:
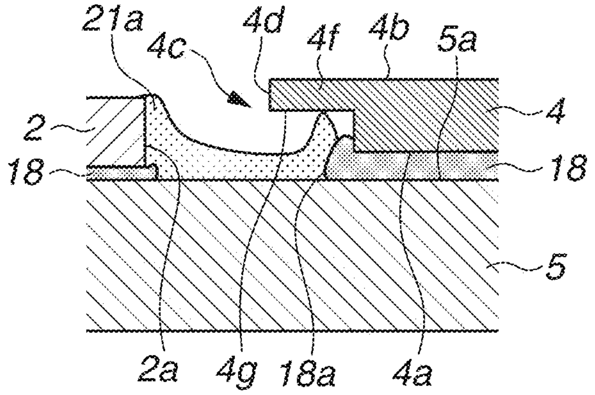
Figure 7D:
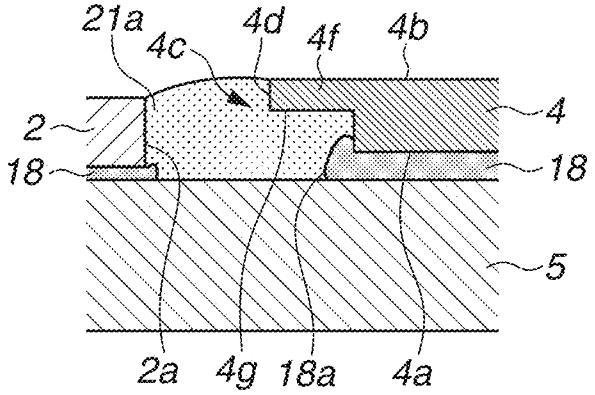

A cover member 4 of a second exemplary embodiment of the present disclosure will be described with reference to FIGS. 7A to 7D. Of the cover member 4 of the present exemplary embodiment, a side portion facing an element substrate 2 (i.e., an inner peripheral portion 4*c* facing an outer periphery 2*a* of the element substrate 2, in an opening portion 17 of the cover member 4) is not a mere flat surface, and has a step, and a protrusion portion 4*f* protruding toward the element substrate 2 side is formed. In other words, of the inner peripheral portion 4*c* of the opening portion 17 of the cover member 4, a distance L1 to the outer periphery 2*a* of the element substrate 2 at a bonding surface 4*a* of the cover member 4 with a support member 5 is greater than a distance L2 to the outer periphery 2*a* of the element substrate 2 at an opposite surface 4*b* that is opposite to the bonding surface 4*a* of the cover member 4 with the support member 5. In the present exemplary embodiment as well, as illustrated in FIG. 7A, when a first sealant 21*a* is applied to a clearance between the outer periphery 2*a* of the element substrate 2 and the inner peripheral portion 4*c* of the opening portion 17 of the cover member 4, the first sealant 21*a* creeps up on the outer periphery 2*a* of the element substrate 2 which is hydrophilic. When filling with the first sealant 21*a* continues, as illustrated in FIG. 7B, the first sealant 21*a* flows on the support member 5, which is hydrophilic, toward the cover member 4 side, and comes in contact with an adhesive 18. The adhesive 18 is water-repellent and thus tends to repel the first sealant 21*a*, and the first sealant 21*a* abuts a surface 4*g* on the support member 5 side of the protrusion portion 4*f* of the cover member 4 covering the adhesive 18. Subsequently, when the first sealant 21*a* comes in contact with the protrusion portion 4*f* of the cover member 4, which is hydrophilic, the first sealant 21*a* moves toward the element substrate 2 along the surface 4*g* on the support member 5 side of the protrusion portion 4*f* which is hydrophilic, as illustrated in FIG. 7C, so that filling is facilitated. When the first sealant 21*a* reaches a position the same height as the height of the front surface of the cover member 4, as illustrated in FIG. 7D the first sealant 21*a* is held between the outer periphery 2*a* of the element substrate 2 and the inner peripheral portion 4*c* of the opening portion 17 of the cover member 4. The liquid surface of the first sealant 21*a* located between the front surface of the element substrate 2 and the front surface of the cover member 4 is maintained by the surface tension. Other configurations and a manufacturing method are similar those of the liquid ejection head 1 of the first exemplary embodiment, and therefore the description thereof will be omitted. In the present exemplary embodiment as well, an effect similar to the effect of the first exemplary embodiment is obtained.

[Action and Effect]

As apparent from the above-described two exemplary embodiments, according to the present disclosure, running of the first sealant 21*a* sealing the electric connection portion 20 on the cover member 4 is inhibited. Therefore, it is possible to perform satisfactory capping, and to inhibit solidification of the liquid at the ejection port 11 and the neighborhood thereof. In addition, the first sealant 21*a* can seal the electric connection portion 20 well, and a failure such as an electrical failure due to wiring line corrosion or the like can be inhibited. In this way, the liquid ejection head 1 with high reliability can be manufactured.

According to the present disclosure, it is possible to inhibit running of the sealant on the cover member, while securing satisfactory sealing of the electric connection portion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-201202, filed Dec. 16, 2022, which is hereby incorporated by reference herein in its entirety.

What is claimed is:

1. A liquid ejection head comprising:
- an element substrate including an energy generation element for ejecting liquid;
- a support member to which the element substrate is fixed;
- an electric wiring board arranged onto the support member and electrically connected to the element substrate by an electric connection portion;
- a sealant sealing the electric connection portion between the element substrate and the electric wiring board; and
- a cover member fixed onto the support member, and disposed to avoid the electric connection portion and the element substrate when viewed from a direction perpendicular to a surface of the element substrate,
- wherein, in a direction parallel with the surface of the element substrate, the cover member includes a part facing an outer periphery of the element substrate, and, of the part, a distance to the outer periphery of the element substrate at a first surface of the cover member bonded with the support member is greater than a distance to the outer periphery of the element substrate at a second surface that is opposite to the first surface, and
- wherein the element substrate includes a first terminal electrically connected to the energy generation element, the electric wiring board includes a second terminal located side by side with the first terminal, and the electric connection portion includes the first terminal, the second terminal, and a connecting member that electrically connects the first terminal and the second terminal.

2. The liquid ejection head according to claim 1, wherein the cover member is disposed on the support member to overlap a part of the electric wiring board when viewed from the direction perpendicular to the surface of the element substrate.

3. The liquid ejection head according to claim 1, wherein the part facing the outer periphery of the element substrate in the cover member includes a surface connected to the opposite surface and extending in a thickness direction.

4. The liquid ejection head according to claim 1, wherein the support member includes a flow path for supplying liquid to the element substrate.

5. A liquid ejection head comprising:
- an element substrate including an energy generation element for ejecting liquid;
- a support member to which the element substrate is fixed;
- an electric wiring board arranged onto the support member and electrically connected to the element substrate by an electric connection portion;
- a sealant sealing the electric connection portion between the element substrate and the electric wiring board; and
- a cover member fixed onto the support member, and disposed to avoid the electric connection portion and the element substrate when viewed from a direction perpendicular to a surface of the element substrate,
- wherein, in a direction parallel with the surface of the element substrate, the cover member includes a part facing an outer periphery of the element substrate, and, of the part, a distance to the outer periphery of the element substrate at a first surface of the cover member bonded with the support member is greater than a distance to the outer periphery of the element substrate at a second surface that is opposite to the first surface, wherein the cover member includes an opening portion, and the element substrate is disposed inside the opening portion, and wherein the part facing the outer periphery of the element substrate in the cover member is an inner peripheral portion of the opening portion.

6. A liquid ejection head comprising:

an element substrate including an energy generation element for ejecting liquid;

a support member to which the element substrate is fixed;

an electric wiring board arranged onto the support member and electrically connected to the element substrate by an electric connection portion;

a sealant sealing the electric connection portion between the element substrate and the electric wiring board; and a cover member fixed onto the support member, and disposed to avoid the electric connection portion and the element substrate when viewed from a direction perpendicular to a surface of the element substrate, wherein, in a direction parallel with the surface of the element substrate, the cover member includes a part facing an outer periphery of the element substrate, and, of the part, a distance to the outer periphery of the element substrate at a first surface of the cover member bonded with the support member is greater than a distance to the outer periphery of the element substrate at a second surface that is opposite to the first surface, and wherein the part facing the outer periphery of the element substrate in the cover member includes an inclined surface or a curved surface on which a distance to the outer periphery of the element substrate continuously changes.

7. The liquid ejection head according to claim 6, wherein the part facing the outer periphery of the element substrate in the cover member includes a protrusion portion protruding to the element substrate side, and the protrusion portion includes the opposite surface.

8. The liquid ejection head according to claim 1, wherein the cover member is formed of ceramic.

9. The liquid ejection head according to claim 1, wherein the cover member is formed of alumina.

10. The liquid ejection head according to claim 1, wherein the cover member is fixed to the support member by an adhesive, and the adhesive extends toward the element substrate side, farther than an end portion on a side near the outer periphery of the element substrate at the bonding surface of the cover member with the support member.

11. The liquid ejection head according to claim 6, wherein the support member and the cover member are each made of a hydrophilic material, and the adhesive is made of a water-repellent material.

12. The liquid ejection head according to claim 7, wherein a pure water contact angle on the first surface of the cover member is 40 degrees or less.

* * * * *